United States Patent
Travis et al.

(10) Patent No.: US 8,152,315 B2
(45) Date of Patent: Apr. 10, 2012

(54) FLAT-PANEL OPTICAL PROJECTION APPARATUS WITH REDUCED DISTORTION

(75) Inventors: Adrian Travis, South Devon (GB);
Timothy Andrew Large, Essex (GB);
Neil Emerton, Cambridgeshire (GB)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 12/444,003

(22) PCT Filed: Oct. 2, 2007

(86) PCT No.: PCT/GB2007/003736
§ 371 (c)(1),
(2), (4) Date: Apr. 2, 2009

(87) PCT Pub. No.: WO2008/040960
PCT Pub. Date: Apr. 10, 2008

(65) Prior Publication Data
US 2010/0091254 A1    Apr. 15, 2010

(30) Foreign Application Priority Data
Oct. 2, 2006  (GB) .................................. 0619366.8

(51) Int. Cl.
*G03B 21/00* (2006.01)
*G02B 6/26* (2006.01)
*G02B 6/036* (2006.01)
*G02B 6/10* (2006.01)

(52) U.S. Cl. ........... 353/122; 385/50; 385/129; 385/146

(58) Field of Classification Search .................. 385/129, 385/50, 146; 353/122; 362/600, 615, 616
See application file for complete search history.

(56) References Cited

U.S. PATENT DOCUMENTS
4,678,267 A    7/1987  Burns et al.
(Continued)

FOREIGN PATENT DOCUMENTS
WO    WO0172037(A1)    9/2001
(Continued)

OTHER PUBLICATIONS
Travis, et al., "P-127: Linearity in Flat Panel Wedge Projection". SID 03 Digest, vol. XXXIV, 2003, p. 716.
(Continued)

*Primary Examiner* — Thanh X Luu
*Assistant Examiner* — Danell L Owens
(74) *Attorney, Agent, or Firm* — Lee & Hayes, PLLC

(57) ABSTRACT

A light guide of the tapered-waveguide type includes an input slab (30) for expanding a projected image between an input end and an output end (40); and a tapered output slab (10) arranged to receive rays from the said output end of the input slab, and to emit them at a point on its face that corresponds to the angle at which the ray is received. The taper is calculated so that all rays injected into the input end undergo the same number of reflections before leaving the output face. The thickness of the input slab light guide (30) is greater in the transverse direction away from the centre line C, so that light travelling at the critical angle from the input face of the slab waveguide towards the output waveguide (10) bounces the same number of times in the input slab, regardless of its fan-out angle, in order to further reduce image distortion.

20 Claims, 3 Drawing Sheets

U.S. PATENT DOCUMENTS

| | | |
|---|---|---|
| 6,483,967 B2 | 11/2002 | Tang et al. |
| 7,101,048 B2 * | 9/2006 | Travis .............................. 353/69 |
| 2008/0316768 A1 * | 12/2008 | Travis ........................... 362/617 |

FOREIGN PATENT DOCUMENTS

| | | |
|---|---|---|
| WO | WO0243381(A1) | 5/2002 |
| WO | WO0245413(A1) | 6/2002 |
| WO | WO02060187(A1) | 8/2002 |
| WO | WO03013151(A2) | 2/2003 |
| WO | WO2006082444(A2) | 8/2006 |

OTHER PUBLICATIONS

The European Office Action mailed Apr. 7, 2011 for European Patent Application No. 07823957.1, a counterpart foreign application of U.S. Appl. No. 12/443,270.

\* cited by examiner

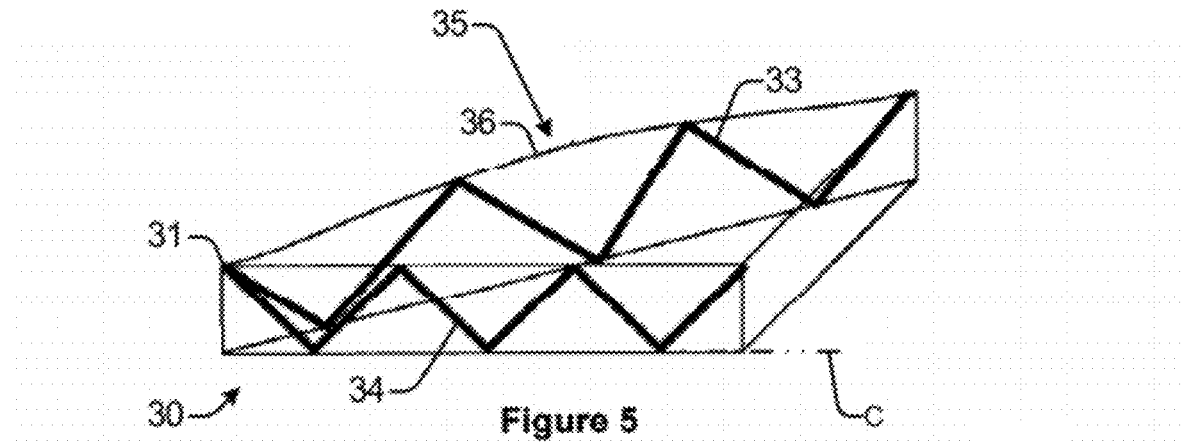
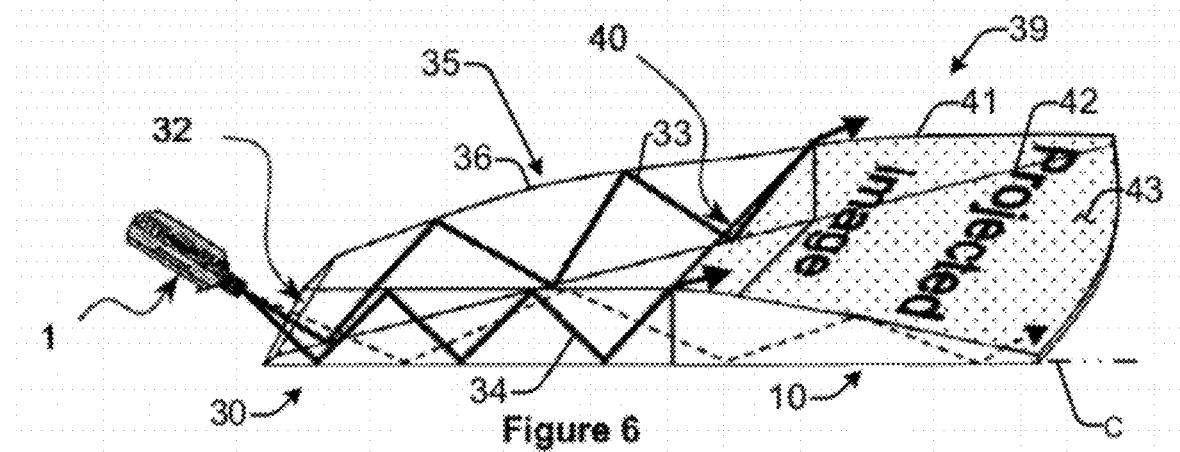
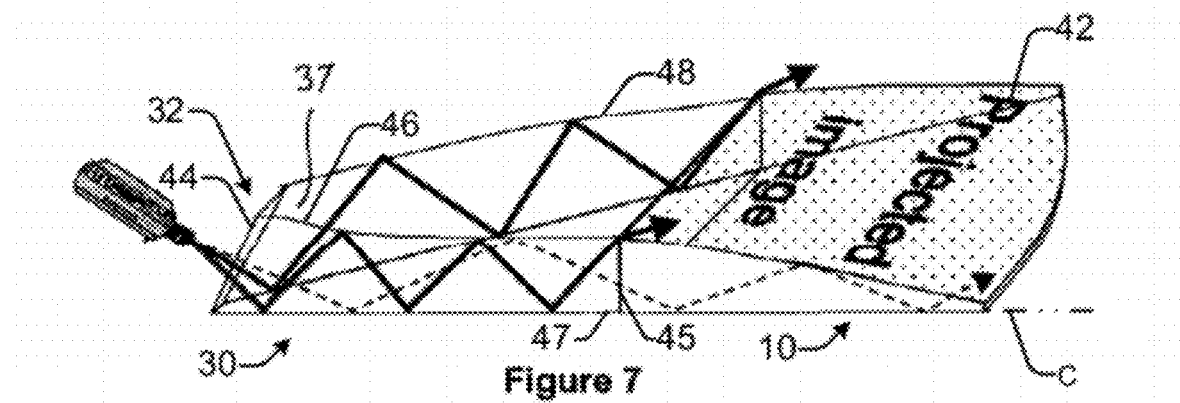

FLAT-PANEL OPTICAL PROJECTION APPARATUS WITH REDUCED DISTORTION

RELATED APPLICATIONS

This application is a National Stage of International Application No. PCT/GB2007/003736, filed on Oct. 2, 2007, which claims priority from Great Britain Patent Application No. 0619366.8, filed on Oct. 2, 2006. Both applications are incorporated herein by reference.

This invention relates to projection displays and is a way of projecting an image through a light guide with reduced distortion.

Video projectors produce big moving images at low cost. An inexpensive way of making a television is, as shown in FIG. 1, to point a projector 1 via a mirror 3 onto the rear of a diffusive screen 5. This form of projection television is, however, bulky and users prefer displays to be slim.

A slim projection display can be made according to the applicant's earlier WO 01/72037 by pointing a video projector into the thick end of a tapered light-guide. The principle is illustrated in FIG. 2; the rays entering the thick end 12 of a tapered-panel waveguide 10 via an inclined face bounce at progressively steeper angles until they exceed the critical angle and exit; a shallow ray (solid line) travels further before this happens and therefore exits further along the display (up, in the usual orientation). This is called the tapered-waveguide principle, though it could be brought about by GRIN techniques instead of a purely geometrical taper.

A problem is that, since the projector is much smaller in the lateral dimension than the panel, rays fan out from the point of injection, so the projected image will be V-shaped. Furthermore, the projected image will be broken into bands: each band contains all the rays that undergo a given number of reflections, while the set of rays which have undergone one pair of reflections more or less than rays exiting in adjacent bands will be separated by a gap.

As explained in WO 01/72037, one can insert a transparent input slab of constant thickness between the projector and the tapered light-guide; this means that rays will have the opportunity to fan out before entering the tapered light-guide, so that the projected image becomes trapezoidal. This is less objectionable than a V-shape but there is still significant keystone distortion. Moreover, viewers like images to fill the screen, so it is desirable to fold the input slab behind the tapered light-guide. This can be done with a pair of right-angled prisms spanning the width of the screen.

A ray entering the input slab at slightly less than the critical angle with respect to its faces undergoes many reflections in the slab but few in the tapered light-guide, whereas a ray entering at much less than the critical angle undergoes few reflections in the slab and many in the tapered light-guide. WO 03/013151 by the applicant explains how to shape the tapered light guide in order that the sum of reflections through the system is the same for rays at all angles of entry, so the projected image is no longer broken into bands.

Because this profile is designed for rays along the centre-line, it works less well with skew rays, i.e. rays at a large fan-out angle, and if the projected image is widened, its sides become dim and may still break into bands.

Dimness at the sides can be eliminated by making the shape of the input slab plus tapered light guide equivalent to an extrusion of the profile along the centre-line in a circle about the point of light injection, as shown in FIG. 3, which represents the system shown in WO 2006/082444, cut along the centre line. The solid line is a ray injected into the input slab 20 at the largest possible angle (bottom of image), while the dashed line is that at the lowest angle, exiting the tapered waveguide at the top of the image. Rays are now never skew to the direction for which the profile was designed, but the system is polar-symmetric, so the projected image is distorted into curves. Furthermore, the boundary between the slab and tapered light-guide is no longer straight, so the system cannot be folded with straight prisms of constant cross-section.

Tapered light-guides can also be used in reverse according to WO 02/45413 so that a camera pointed into the thick end of the input slab captures an image of whatever is placed against the face of the tapered light-guide, but the same problems with polar symmetry arise.

According to the invention there is provided a light guide of the tapered-waveguide type, including an input slab for expanding a projected image between an input end and an output end; an output waveguide arranged to receive rays from the said output end of the input slab, and to emit them at a point on an output surface that corresponds to the angle at which the ray is received; the profile of the output waveguide being such that all rays injected into the input end of the input slab undergo the same number of reflections before leaving the output surface of the output waveguide; wherein, transverse to the general direction of ray travel, the thickness of the input slab varies so that light travelling from the input end of the input slab towards the output waveguide bounces the same number of times, regardless of its fan-out angle, i.e. its angle away from the centre line.

This variation in thickness enables the transition region between input slab and output waveguide to be straight, extending transversely to the general ray travel direction. This line would normally be the bottom edge of the display, with the input slab folded behind.

For a better understanding of this invention a specific embodiment will now be described by way of example with reference to the accompanying drawings, in which:

FIG. 5 shows a slab embodying the present invention, again depicting one half of the slab to the left of the axis of projection;

FIG. 6 illustrates half of a tapered light-guide display of the present invention; and FIG. 7 illustrates a second embodiment of the invention.

Figure 1:
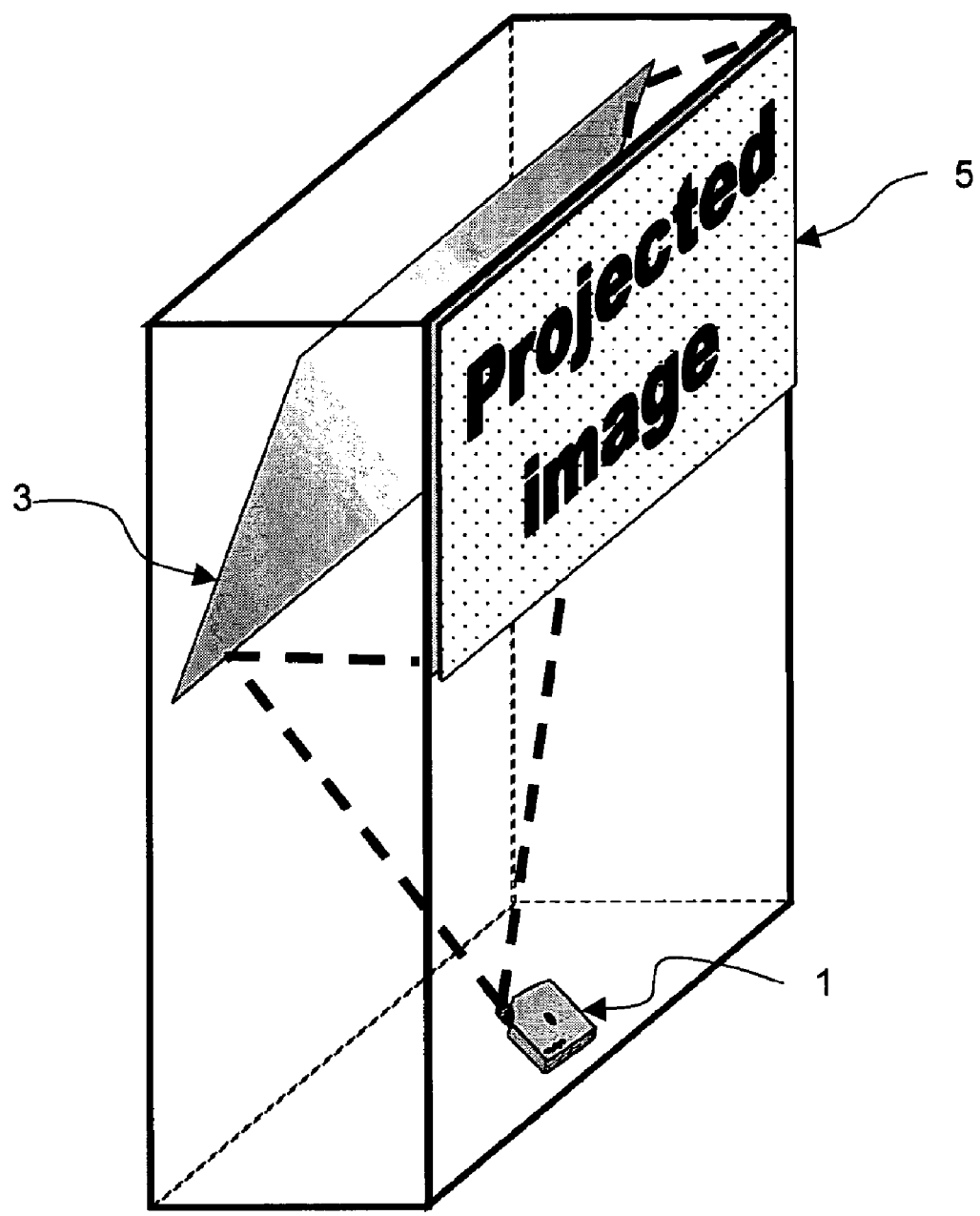
FIG. 1 illustrates a rear-projection television display of known type.
Figure 2:
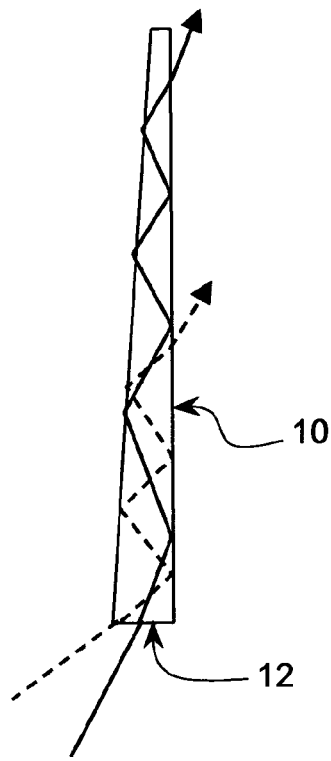
FIG. 2 illustrates the principle of a tapered light-guide display.
Figure 3:
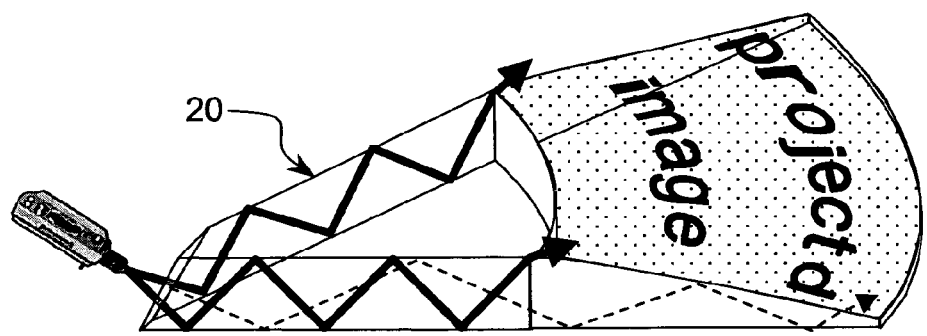
FIG. 3 illustrates the principle of a polar-symmetric light-guide display, depicting one half of the display to the left of the axis of projection.

In a composite flat-panel display or similar optical apparatus consisting of an input slab over the length of which rays fan out to cover the full width of the apparatus, and an output waveguide of the tapered type from which rays exit at a point dependent on their angle of input, rays that form the bottom of the projected image undergo almost no reflections within the tapered light-guide. If all rays are to undergo the same number of reflections before exit, then it follows that rays that form the bottom of the projected image should undergo the same number of reflections as one another within the input slab. Since these rays are to leave the tapered light-guide shortly after entry, the rays should all leave the input slab at close to the critical angle (solid lines in FIG. 3). Furthermore, if the bottom of the projected image is to be undistorted, then the points of each ray's final reflection within the slab should form a straight line.

These conditions cannot be met within a conventional flat-faced input slab because the distance from the projector to the far corners of the slab is greater than along the centre-line, and in such a slab rays at the critical angle undergo the same number of reflections per unit distance of light-guide.

Figure 4:
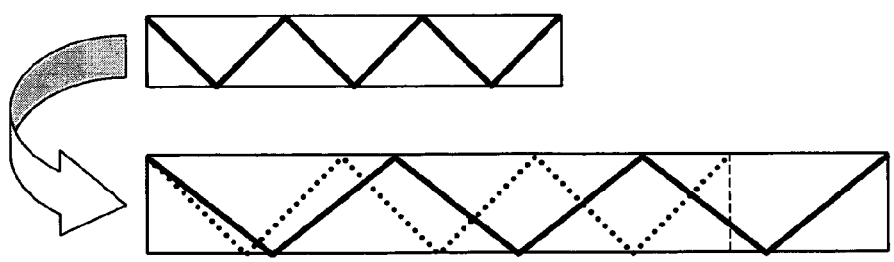
FIG. 4 shows how ray period increases when rays pass from a thin to a thick light-guide.

The invention therefore envisages an input slab whose sides are thicker than its centre. That is, a cross-section in the transverse direction perpendicular to a central axis of ray travel is thinner in the centre than at the edges. The thickening of a light-guide in this way increases the distance between reflections in the first place merely by virtue of scale, as shown by the dotted lines in the thicker guide of FIG. 4. In fact, in the second place, the product of thickness and the cosine of ray angle is constant in a smooth light-guide of varying thickness, as shown in WO 03/013151 so ray angle decreases as it travels through a light guide of varying thickness, which adds to the effect of scaling, as shown by the solid lines in FIG. 4.

The slab 30 can have only one thickness at the point of injection 31, so the variation in thickness between different ray paths 33, 34 is introduced part-way along the slab 30 as a bulge 36 in a region 35, as shown in FIG. 5. The input slab 30 is shown as having a generally triangular form, matching the fan-out to the lowest corners of the output waveguide 10.

The resulting display 39 is shown in FIG. 6, with a straight junction or transition region 40. This figure shows half the display 39, from the centre line C to the left-hand edge 41. The waveguides 10, 30 are symmetrical about the centre line C. Also shown is the projector 1 injecting an image 42 over a range of out-of-plane angles into an inclined face 32, representing the input in a display (or the output in a camera system with the projector replaced by a small camera). Typically, the output waveguide 10 is an order of magnitude wider than the input end 32. Its output face 43 (shaded) is generally rectangular, starting at the transition region 40. The image rows are substantially parallel to this transition region 40, representing the lower edge of the image 42.

If the centre of the slab has constant thickness, then the profile along the centre-line of the tapered light-guide will be the same as that described in WO 03/013151. But rays which travel through the sides of the input slab 30 will encounter a variable thickness profile within the slab, and it might be expected that the profile for the tapered light-guide will need in turn to be adjusted if all rays are to undergo the same number of bounces as required. Some alterations may indeed be desirable, and these can be found by ray tracing in a manner which will be routine for one who is trained in the art of optical engineering and who has understood WO 03/013151, but it turns out that the alterations are minor.

The uniformity of the image projected through a light-guide is satisfactory if variations in the thickness of the light-guide are gradual, but at wide fan-out angles the curvature introduced by thickening the sides half way along the slab can be too great and the image appears banded. There can in any case be an advantage if the input slab 30 itself is slightly tapered, as described in GB 0619226.4, because this reduces the curvature at the interface between input slab and tapered output light-guide. A further embodiment of the invention is therefore described in which the slab input 44 is thicker than the slab output 45, but the thickness 46 along the centre-line C diminishes to the output thickness 47 over a short distance (region 37) from the input end 32, whereas the thickness along the slab side 48 diminishes to the output thickness 47 over a longer distance, say at least half-way along, as shown in FIG. 7. Furthermore, the slab 30 should be designed so that all rays that emerge from the slab 30 at the critical angle undergo the same number of reflections as one another within the slab 30.

As mentioned above, the same principles apply for a tapered light-guide if it is to be used in reverse with a camera in place of the projector, though here the term "input slab" or "expansion slab" is not so appropriate—"concentrator" or "lateral expansion/contraction slab" might be better—and the tapered output waveguide could be called a "collector" waveguide.

In summary, a light guide of the tapered-waveguide type includes an input slab 30 for expanding a projected image between an input end and an output end 40; and a tapered output slab 10 arranged to receive rays from the said output end of the input slab, and to emit them at a point on its face that corresponds to the angle at which the ray is received. The taper is calculated so that all rays injected into the input end undergo the same number of reflections before leaving the output face.

However, for a known kind of input slab this might still result in distortion at off-axis angles in the plane. Hence in the invention the thickness of the input slab light guide 30 is greater in the transverse direction away from the centre line C, so that light travelling at the critical angle from the input face of the slab waveguide towards the output waveguide 10 bounces the same number of times in the input slab, regardless of its fan-out angle. The interface to the tapered output waveguide can then be a straight line 40.

The invention claimed is:

1. A light guide comprising:
   an input slab for expanding a projected image injected into an input end as the projected image travels toward an output end; and
   an output waveguide arranged to receive rays from the output end of the input slab, and to emit the rays at a point on an output face that corresponds to an angle at which the ray is received, in which
   all rays injected into the input end undergo a same number of reflections in total before leaving the output face, and
   a thickness of the input slab is varied in a transverse direction perpendicular to a centre-line corresponding to a central axis of ray travel so that light travelling at an out-of-plane angle of incidence from the input end of the input slab toward the output waveguide leaves the input slab at close to a critical angle and bounces a same number of times in the input slab, regardless of a fan-out angle away from the central axis in the transverse direction.

2. A light guide according to claim 1, in which the input slab is thicker at the input end than at the output end.

3. A light guide according to claim 2, in which the thickness of the input slab decreases earlier along the central axis of ray travel than along edges lateral to the central axis.

4. A light guide according to claim 1, in which the input slab has a constant thickness along the centre-line corresponding to the central axis of ray travel and a bulge of increased thickness along edges lateral to the central axis.

5. A light guide according to claim 1 further comprising a projector arranged to inject an image into the input end of the input slab to provide a display including the light guide.

6. A light guide according to claim 1 further comprising a camera to provide a camera apparatus including the light guide.

7. A light guide according to claim 5, in which the projector is much smaller in the transverse direction than the output waveguide.

8. A light guide according to claim 6, in which the camera is much smaller in the transverse direction than the output waveguide.

9. A light guide comprising:
an input slab that allows light rays travelling from an input end toward an output end to fan out; and
an output waveguide arranged to receive the light rays from the output end of the input slab, and to emit the light rays at a point on an output face that corresponds to an angle at which the light ray is received from the input slab, in which:
the light rays leaving the output face undergo a same number of reflections in total from the input end of the input slab to the output face of the output waveguide, and
a thickness of the input slab is varied in a transverse direction perpendicular to a centre-line corresponding to a central axis of ray travel so that light travelling at an out-of-plane angle of incidence from the input end of the input slab toward the output waveguide bounces a same number of times in the input slab, regardless of a fan-out angle away from the central axis in the transverse direction.

10. A light guide according to claim 9, in which the input slab is thicker at the input end than at the output end.

11. A light guide according to claim 10, in which the thickness decreases earlier along the central axis of ray travel than along edges lateral to the central axis.

12. A light guide according to claim 9, in which the input slab has a constant thickness along the centre-line corresponding to the central axis of ray travel and a bulge of increased thickness along edges lateral to the central axis.

13. A light guide according to claim 9, further comprising a projector arranged to inject an image into the input end of the input slab to provide a display including the light guide.

14. A light guide according to claim 9, further comprising a camera to provide a camera apparatus including the light guide.

15. A light guide comprising:
an input slab that allows light rays travelling from an input end toward an output end to fan out toward lateral edges of the input slab; and
an output waveguide arranged to receive the light rays from the output end of the input slab, and to emit the light rays at a point on an output face that corresponds to an angle at which the light ray is received from the input slab, in which:
a thickness of the input slab is varied from the lateral edges to a centre-line of the input slab corresponding to a direction of ray travel so that the light rays travelling at an out-of-plane angle of incidence from the input end of the input slab toward the output waveguide reflect a same number of times in the input slab regardless of a fan-out angle of the light rays toward the lateral edges of the input slab, and
the light rays leaving the output face of the output waveguide undergo a same number of reflections in total from the input end of the input slab to the output face.

16. A light guide according to claim 15, in which the input slab is thicker at the input end than at the output end.

17. A light guide according to claim 16, in which the thickness of the input slab decreases earlier along the centre-line than along the lateral edges of the input slab.

18. A light guide according to claim 15, in which the input slab has a constant thickness along the centre-line corresponding to the direction of ray travel and a bulge of increased thickness along the lateral edges.

19. A light guide according to claim 15, further comprising a projector arranged to inject an image into the input end of the input slab to provide a display including the light guide.

20. A light guide according to claim 15, further comprising a camera to provide a camera apparatus including the light guide.

* * * * *